United States Patent [19]

Haeg et al.

[11] Patent Number: 4,527,416
[45] Date of Patent: Jul. 9, 1985

[54] VEHICLE RESTRAINT SYSTEM

[75] Inventors: Steven R. Haeg, Shorewood; Michael G. LaCroix, Eden Prairie, both of Minn.

[73] Assignee: MTS Systems Corporation, Eden Prairie, Minn.

[21] Appl. No.: 584,462

[22] Filed: Feb. 28, 1984

[51] Int. Cl.³ .............................................. G01M 17/04
[52] U.S. Cl. .................................................. 73/11; 73/669
[58] Field of Search ....................................... 73/11, 669

[56] References Cited

U.S. PATENT DOCUMENTS 3,937,058  2/1976  Hilbrands ............................ 73/11

FOREIGN PATENT DOCUMENTS 1101812  3/1961  Fed. Rep. of Germany ........ 73/669
2394077  1/1979  France .................................. 73/669

Primary Examiner—Herbert Goldstein
Attorney, Agent, or Firm—Kinney & Lange

[57] ABSTRACT

A restraint system for a vehicle undergoing tests with individual wheel supports and actuators. One of the supports has a wheel restraint to prevent lateral and fore and aft movement of the wheel. A diagonal wheel support has a wheel restraint to prevent lateral movement only.

7 Claims, 6 Drawing Figures

VEHICLE RESTRAINT SYSTEM

BACKGROUND OF THE INVENTION

1. Field of the Invention

The present invention relates to an apparatus for restraining a vehicle being tested with four individual actuators, each operating on a separate one of the wheels of a test vehicle.

2. Description of the Prior Art

In the prior art, it has been common to test fully assembled vehicles, such as automobiles, with individual actuators supporting each of the vehicle wheels, wherein the actuators are individually controlled to provide a substantial amount of movement to simulate loads on the vehicle.

The common form of restraint for the vehicle on such a test system is to secure each of the wheels from motion in all directions, that is, fore and aft and laterally. During testing with a fully restrained vehicle the actuator rods tend to wear because of side loading on the rods, particularly during rapid movements and substantial differentials in movement between the individual actuators.

A common restraint device is a type of "bucket" which will receive each of the vehicle wheels and restrain them securely from movement in any fore and aft or lateral direction.

SUMMARY OF THE INVENTION

The present invention relates to a restraint arrangement for testing vehicles wherein each of the individual wheels of the vehicle is moved in vertical direction with an actuator, and securing only one of the wheels against movement in both directions and providing only lateral or side to side restraint for a diagonally opposite wheel on a four wheel vehicle. Each of the other wheels is supported for rolling movement on a support connected to the respective actuators.

The restraint permits the vehicle to be positively held for testing movement by the actuators, and minimizes side loads on the actuator rods.

DETAILED DESCRIPTION OF THE PREFERRED EMBODIMENTS

Figure 1:
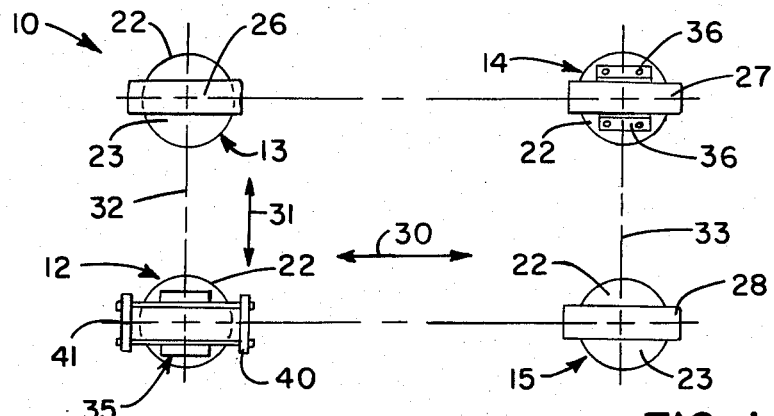
FIG. 1 is a top plan view of a typical vehicle test layout utilizing a restraint apparatus according to the present invention.

A test system layout shown generally at 10 for a vehicle (not shown) includes four individual actuator assemblies 12, 13, 14 and 15 which are servo controlled hydraulic actuators. As shown perhaps best in FIG. 2, the actuators include a cylinder portion 20 having an internal piston which is subjected to differential pressures to move an actuator rod 21 under control of a servovalve and conventional controls therefore. The actuator rod 21 is suitably mounted through a cap or end portion of the cylinder 20, so that it is sealed and guided, and is mounted for sliding movement along its longitudinal axis as the internal piston moves. A wheel support pad 22 is mounted on the outer end of each of the actuators 12, 13, 14 and 15, and each such pad has a flat or planar upper surface 23, and a suitable connecting neck 24 that attaches to the rod 21. The upper surface 23 is used for supporting a wheel shown typically at 25, and also schematically at 26, 27, and 28 in FIG. 1. The term "wheel" is meant to include a tire on a wheel rim.

The vehicle wheels are of conventional design and the entire vehicle is mounted on the wheel pads of the individual actuator assemblies for testing. The actuator rods are cycled up and down while being controlled as to displacement and velocity.

In the prior art devices, each of the vehicle wheels is restrained against fore and aft movement, which is generally in the direction as indicated by the double arrow 30, or lateral movement indicated by the double arrow 31. Lateral movement is side to side in relation to the vehicle (parallel to the axis of rotation of the wheels as the vehicle moves straight ahead) and fore and aft movement is along the central axis of normal movement of the vehicle.

In conventional test systems wherein each of the individual wheels is restrained, when there is a substantial differential in movement or displacement between actuators, the rods 21 of the actuators will be side loaded, that is, loaded in the direction perpendicular to the axis of the rod. This will cause excessive wear of the rods, and may also result in failure of the actuator rod seals which seal against the pressure on the interior of the cylinder portions of each of the actuators.

In order to obviate the problems involved with excessive side loading of the actuator rods, the present invention provides for a restraint apparatus that restrains one of the wheels in both lateral and fore and aft directions (preferably a wheel which steers about an upright steer axis), and a diagonally opposite wheel, which has restraint in lateral or side to side direction.

The rolling axes of the wheels are shown at 32 for the front wheels (during straight ahead movement) and at 33 for the rear wheels of a vehicle being tested.

Figure 2:
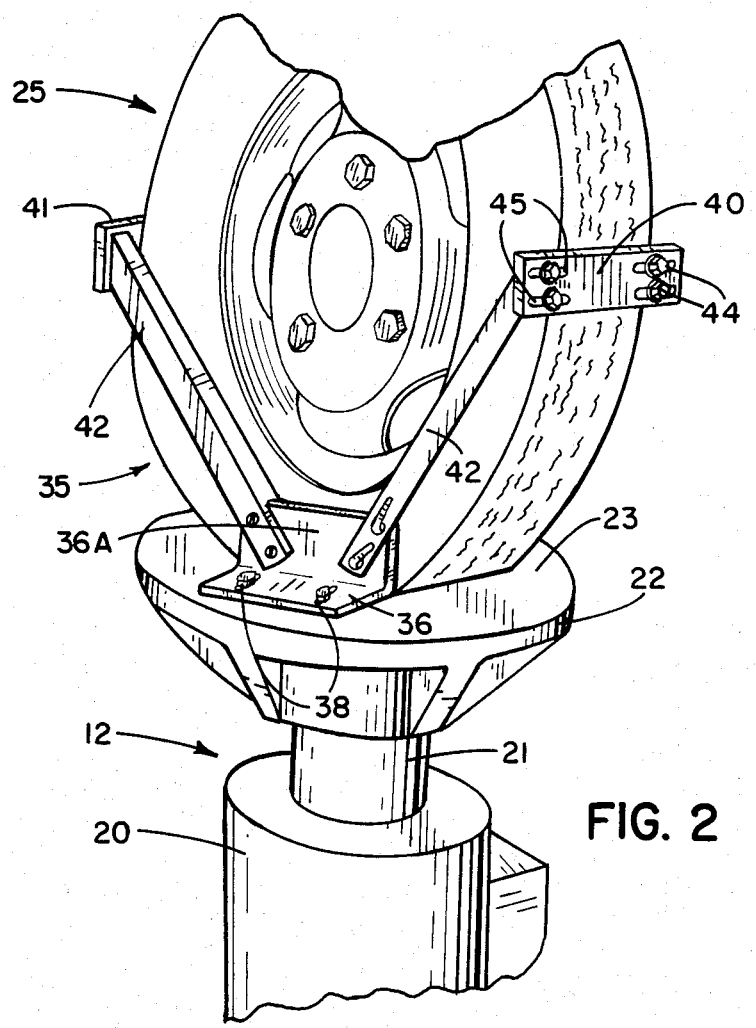
FIG. 2 is a perspective view of a forward wheel of a vehicle being tested showing the restraint arrangement for such wheel.
Figure 3:
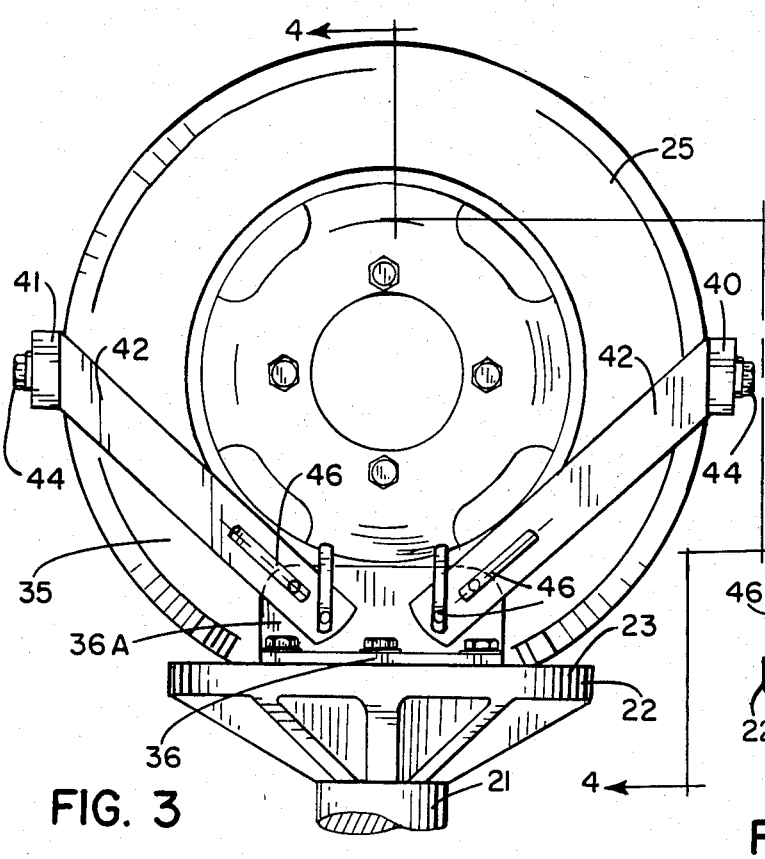
FIG. 3 is a side elevational view of a forward wheel of a vehicle being tested.
Figure 4:
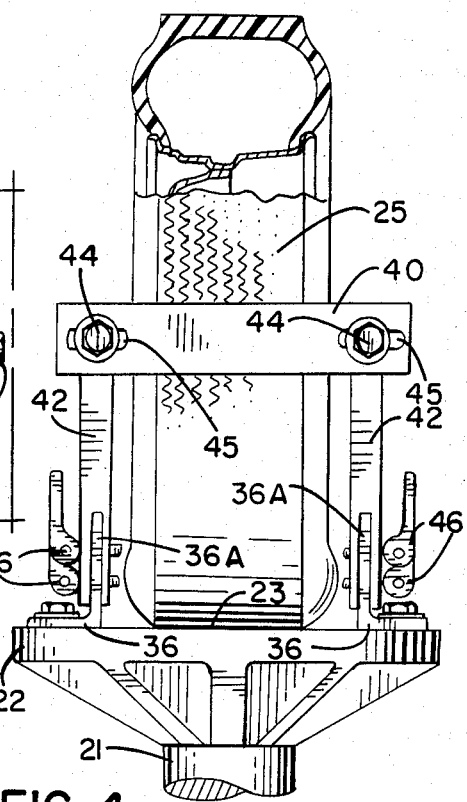
FIG. 4 is a rear view of the wheel restraint shown in FIG. 3, and taken generally along line 4—4 in FIG. 3.

The restraint of a front or steering wheel and tire 25 to restrain movement in both lateral and fore and aft directions preferably is of the form shown in FIGS. 2, 3 and 4. The wheel pad 22, and the upper surface thereof shown at 23 has a wheel restraint assembly indicated at 35 mounted thereon. The restraint assembly includes a pair of upright angle iron blocks 36 on opposite sides of the wheel 25 which are fastened to the wheel pad with suitable cap screws 37. The blocks 36 have elongated slots 38 therein which are used for lateral adjustment in and out relative to the wheel so that they may be adjusted to be close to the tire on the wheel as shown in FIG. 4. The blocks may be made to contact the tire if desired.

Fore and aft restraint is accomplished, in the preferred form shown, with a first restraint bar 40 at the rear side of the wheel, and a second restraint bar 41 at the forward side of the wheel. These restraint bars are each fastened to a separate pair of diagonal support struts 42 that extend upwardly and fore and aft, respectively, from provided openings in the upright legs 36A of the lateral blocks 36. The struts or bars 42 have upper ends that are threaded to receive cap screws 44 that pass through adjustment slots 45 at opposite ends of the restraint bars 40 and 41, respectively. The struts 42 are clamped in place to keep the struts 42 adjacent the sides of the tire forming part of wheel 25. The ends of the struts in turn are clamped onto the upright legs 36A of blocks 36 with suitable clamp bolts or locking members 46 to securely hold the wheel 25 of the wheel being restrained from fore and aft movement. The restraint blocks 36 also restrain the wheel 25 from substantial lateral movement. The blocks 36 are laterally adjustable to proper width.

The restraint bars 40 and 41 are positioned at a level above the surface 23 substantially equal to the tire rolling radius so the fore and aft restraint is made at the maximum diameter of the tire and there is no tendency to roll over the restraint bars.

Figure 5:
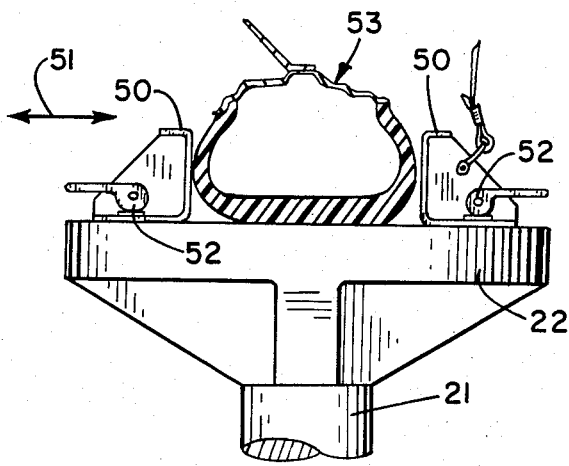
FIG. 5 is a view taken generally along line 5—5 in FIG. 1 showing the restraint of a wheel at a diagonally opposite corner from the wheel shown in FIGS. 2 and 3.
Figure 6:
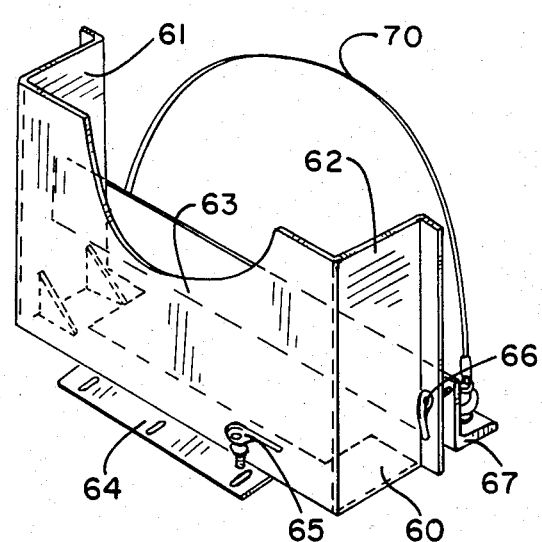
FIG. 6 is a perspective view of a modified form of the wheel restraint utilized in place of the restraint of FIGS. 2 and 3.

In the diagonally opposite corner, on the wheel pad 22 for the actuator assembly 14, a restraint that restrains substantial lateral movement, but permits fore and aft (rolling) movement is shown. As shown primarily in FIG. 5, the wheel pad 22 for this actuator assembly 14 is provided with a pair of lateral restraint blocks 50, 50 on opposite sides of a wheel 53, which are adjustable in and out as indicated by the arrow 51. The blocks 50 can be clamped in place with suitable clamps such as those shown at 52. The clamps shown at 52 are a type of clamp bolt which is a quick clamp device, but cap screws can be used if desired. The blocks here also may be angle iron type blocks which are reinforced with gussets and the upright leg will restrain the wheel 53. The horizontal leg of the blocks have slots for adjustment along surface 23.

The blocks 50 do not substantially restrain fore and aft movement of the wheel 53 at this corner of the vehicle. The blocks 50 will prevent the rear of the vehicle from sliding sideways off the pads (the front wheel having restraint assembly 35 is steerable). The pads will permit rolling of the wheel and tire 53 in fore and aft direction occasioned by differential in vertical displacement of the respective actuators. The other two wheels supported at actuator assemblies 13 and 15 are free to roll on the respective surface 23.

A modified form of the invention is shown in FIG. 5, and here, again, a support is shown which contacts the vehicle wheel to restrain it in fore and aft movement at a location equal to the height of the vehicle axis above its support surface, and to also restrain lateral movement. In this particular form, the vehicle wheel pad is not shown, but a housing 60 is provided with a fore wall 61 and an aft wall 62. A side wall 63 joins the fore wall 61 and aft wall 62 and is positioned to the outside of the vehicle wheel. Side wall 63 is fastened with a bracket 64 to the pad 22 and held in place with suitable clamps 65 or with cap screws. The open side of the housing 60 permits installation of the housing and then a wheel (and tire) may be laterally restrained with an angle iron block 67 that extends along the length of the housing. An adjustable clamp 65 is used to clamp the block 67 adjacent the inner side of a wheel inside the housing 60 between the fore and aft walls 61 and 62.

A wheel will fit inside this housing 60, and will contact the fore and aft walls 61 and 62 only at its maximum diameter, that is at a level above the support surface 23 for that particular vehicle pad 22 substantially equal to the height of the axle of the vehicle. The lateral (side-to-side) restraint will be through the use of the block 67, and the wall 63. Suitable adjustment slots for the bracket 64 can be used for adjustment as desired. A cable restraint 70 may optionally be looped over the vehicle axle to prevent the vehicle from accidentally breaking free from the restraints.

The wheel restraint that restrains both fore and aft and lateral movement is used on a steerable wheel, and then a diagonally opposite corner wheel preferably would be restrained from side to side movement only. The second restraint device that restrains against side to side movement only could be made in a different manner, so long as it prevented the rear portions of the vehicle from sliding off its support surfaces. The system is usable to advantage for testing three wheel vehicles, or four or more wheel vehicles having wheel axes spaced in fore and aft direction.

Only one wheel is restrained from rolling movement and the others can roll fore and aft.

Although the present invention has been described with reference to preferred embodiments, workers skilled in the art will recognize that changes may be made in form and detail without departing from the spirit and scope of the invention.

What is claimed is:

1. In a test system for testing vehicles which have a plurality of at least three wheels including a plurality of generally upright actuators operable for displacement in vertical directions, and having wheel supports for each of said vehicle wheels, each of said supports having a generally planar upper surface on which a wheel will rest, the improvement comprising a restraint system including first means on a support supporting one of the vehicle wheels restraining lateral motion and fore and aft motion of such vehicle wheel relative to the associated wheel support and second means on a diagonally located wheel of the same vehicle which restrains only lateral movement of said diagonally located wheel.

2. The apparatus as specified in claim 1 wherein said first means comprises means to bear against the periphery of a wheel being restrained at a level above the wheel support substantially equal to the radius of the wheel.

3. The apparatus as specified in claim 2 wherein said first means comprises a pair of bars extending laterally across the wheel width, and strut means supporting each of the bars extending along the sides of the wheel, and connected to the part of the first means for restraining lateral motion.

4. The apparatus as specified in claim 2 wherein second means restraining said diagonally located wheel comprises a pair of blocks on opposite sides of the wheel, and means to adjustably mount the blocks on its associated wheel support.

5. A method of restraining a multi wheeled vehicle being tested in a test system having actuators for moving each of the individual wheels of the vehicle in a vertical direction, and each actuator having a wheel support that is vertically movable underlying each of the wheels and which permits rolling movement of the vehicle wheels, comprising the steps of restraining one of the vehicle wheels from movement in direction generally parallel to the axis of rotation of such wheel and also in direction perpendicular to the axis of rotation of such wheel, and restraining only one other wheel of the vehicle at an opposite end of the vehicle, the one other wheel being restrained against movement in a direction parallel to the axis of rotation of such wheel while permitting rolling movement of said one other wheel.

6. The method of claim 5 wherein said vehicle has at least four wheels symmetrically located for rotation about parallel axes spaced in fore and aft direction and the step of restraining the one other wheel is performed at a diagonally opposite corner of the vehicle from the one wheel.

7. The method of claim 6 comprising the further step of moving the actuators in vertical directions for testing and permitting all wheels to rotate except the one wheel.

* * * * *